March 18, 1924.  
A. S. MacKENZIE  
SAW CYLINDER  
Filed Aug. 30, 1921  
1,487,346
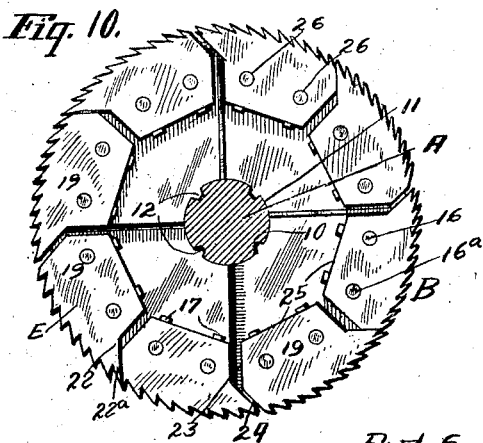
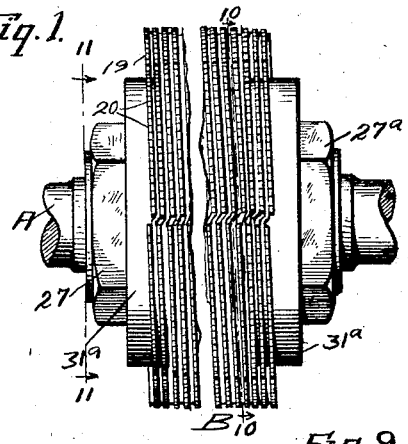
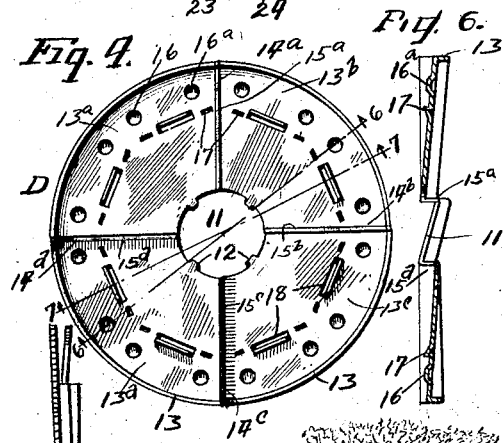
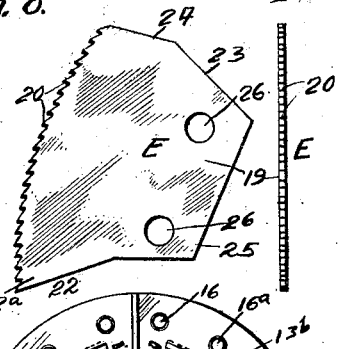
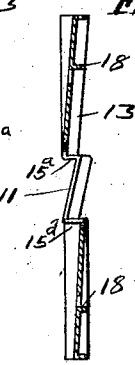
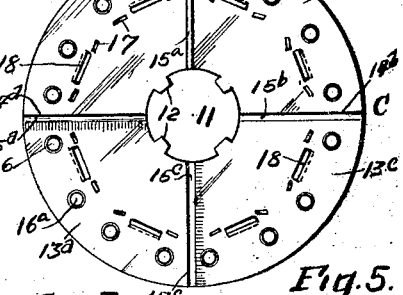
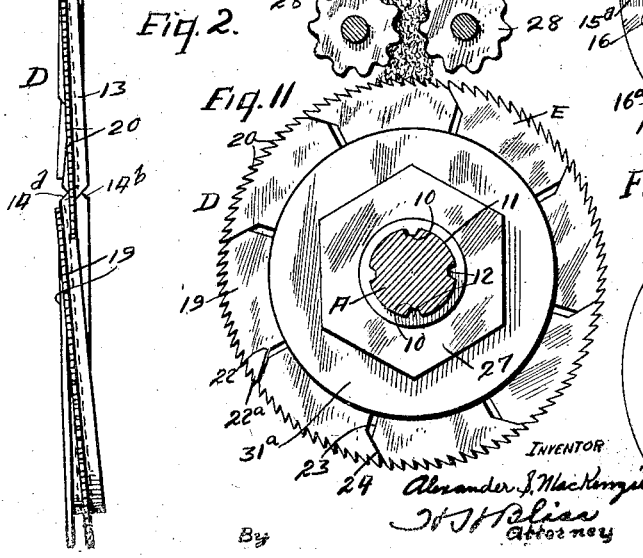
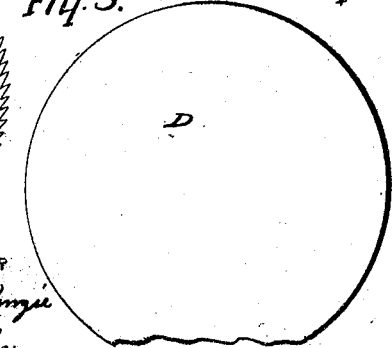
INVENTOR  
Alexander S. MacKenzie  
By  
Attorney Patented Mar. 18, 1924.

1,487,346

UNITED STATES PATENT OFFICE.

ALEXANDER S. MacKENZIE, OF HOUSTON, TEXAS, ASSIGNOR TO THE GARNER GIN COMPANY, INC., OF HOUSTON, TEXAS, A CORPORATION OF TEXAS.

SAW CYLINDER.

Application filed August 30, 1921. Serial No. 496,848.

*To all whom it may concern:*

Be it known that I, ALEXANDER S. MAC-KENZIE, a citizen of the United States, residing at Houston, in the county of Harris and State of Texas, have invented certain new and useful Improvements in Saw Cylinders, of which the following is a specification, reference being had therein to the accompanying drawing.

This invention relates to improvements in the saw cylinders employed in ginning cotton or separating its fibers from other bodies and materials; and improvements in the saws or toothed devices forming parts of such cylinders, and in the means by which they are properly held in position and in relation to each other.

Among the objects of the invention is the designing of a cylinder having parts of such shapes and other characteristics, that a cylinder can be formed therefrom which will be much cheaper, lighter, and more nearly correct in its active surface than have been cylinders heretofore used, and which can be more readily made and repaired.

Fig. 1 is a side view of a part of a saw cylinder embodying my improvements.

Fig. 2 is an edge view of one of the cylinder units detached.

Fig. 3 is a face view of one of the sheet metal disks from which the saw holders are made.

Fig. 4 is a face view of one of the elements of a cylinder unit which holds the saw segments of the set comprised in that unit, this view being taken from the concave side.

Fig. 5 is a face view of the saw holder taken from the opposite side.

Fig. 6 is a section on the line 6—6, Fig. 4.

Fig. 7 is a section taken on the line 7—7, Fig. 4.

Fig. 8 is a face view of one of the saw sections.

Fig. 9 is an edge view of the same.

Fig. 10 shows the cylinder as seen in section on line 10—10, of Fig. 1.

Fig. 11 is a view showing the cylinder in end elevation and the shaft in section on the line 11—11 of Fig. 1; and showing also the relation of the cylinder to the bat-compacting feed rolls.

In the drawings A indicates the shaft which carries the cylinder; the latter being indicated as an entirety by B. The cylinder is formed on the shaft by bringing together a series of saw units each of which is, as an entirety, indicated by C. The units C of the series along the shaft are held rigidly in relation to the axis and against rotation by means of a key and keyway or tongue and groove union, the shaft being provided with a series of longitudinal grooves 10 in which fit tongues carried by the cylinder units.

Each unit C comprises a holding and spacing element D and a set of saw segments E. The holding element D is formed from metal by casting, or pressing, stamping or the like. It is preferably formed of sheet steel, a disk (Fig. 3) of which is subjected to the action of dies so shaped, and applied in such way, as to produce the following characteristics in the saw holder:

Each holder is formed with the central aperture 11 of a diameter which permits it to be slipped along the shaft A. The inner edge is cut to provide tongues 12, respectively, fitting in the grooves 10 on the shaft. The dies also act to form a flange 13 at the periphery of the disk, this flange comprising a series of sections 13$^a$, 13$^b$, 13$^c$, 13$^d$. The radial, annular, web-like part of the disk, between the central aperture 11 and the peripheral flange, is, by the action of the dies or pressing devices changed from its initial shape; four equal segments, 14$^a$, 14$^b$, 14$^c$, 14$^d$, are formed, each being pressed away from the initial normal plane transverse to the axis; and after the pressing action is completed, each of these segments lies in a plane inclined to the central transverse plane. By reference to the drawings it will be noted that each segment is similarly inclined, or inclined in the same direction so that during rotation of the disk the several segments will, when positioned in any given portion of the arc of travel, be arranged in a common substantially spiral path. The pressing action also forms narrow walls at 15$^a$, 15$^b$, diametrically opposite to each other, and two similar, opposite walls 15$^c$, 15$^d$, these walls all lying in axial planes, and serving to strengthen the disk.

At the time the above shaping is effected dowel lugs or projections at 16, 16a, are formed on each of the segments 14a, 14b, etc., and at the same time projecting stops or shoulders 17, 17 are formed by suitable elements on the dies adapted to indent the sheet metal. Simultaneously there are produced in the sheet metal, by suitable cutting and punching elements on the dies, relatively long lips or projections at 18 for bracing and strengthening the holder and spacing it relatively to the next.

The saw elements E are each formed as a segment of a saw disk. There is a main body part indicated by 19 with a series of teeth at 20 on the peripheral edge and an inner edge at 25. Its front edge follows two lines, the part 22 projecting forward to provide an extension 22a. The rear edge follows two lines, the part at 23 being approximately radial, and the part 24 of the edge extending forward from that at 23.

26, 26 are two apertures through the segment of such dimensions that they can receive, and their edges snugly fit, the lugs 16, 16a on a holder D.

As shown in Figs. 1 to 10, there are eight of these saw segments attached to each of the holders D. The inner edge 25 of each segment rests upon two of the lugs 17, 17 to prevent displacement inward, two of the dowel lugs 16, 16a fitting in the apertures 26 and preventing displacement outward.

As shown in Figs. 1 to 8, there are two of the saw segments mounted on each of the segments 14a, 14b, etc., of the holder D, or a total of eight segments in the circle. Instead of eight segments, four can be employed. The curvature of the peripheral part of each segment can be so formed in relation to the positions of the dowel pins or lugs 16, 16a, and to the positions of the stops or projections 17, that all of the teeth in the set of segments on a holder D will be equally distant from the axis. And when so made and applied the operative surface of the entire drum is a true cylinder.

All of the teeth carried by each segment lie in part of the circumference of a circle which is in a plane slightly inclined to transverse planes. There are four sets of teeth on each holder D, and the teeth on each travel in the paths of corresponding teeth on the other three sets, so that there is assurance that during each revolution of the cylinder several teeth shall intersect, at a common point, any line at the surface of the cylinder which is parallel to the axis.

In building up a cylinder, the holders D, are, one after another, placed on the shaft A, they being adapted, as before described, to slide along the shaft with the tongues 11 fitting in the grooves 10. An abutment disk can be used at one end of the series of holders D and held in place by a nut 27 engaging with a threaded section of the shaft A. After the predetermined number of holders, with their saw segments, have been assembled, and brought together, on the shaft, all of the parts are clamped together by means of the nut 27 and an opposing nut 27a bearing against an abutment plate 31a.

The mode of use of one of these cylinders is well understood. When employed for separating cotton, for example, the mass of material is supplied from a hopper or receptacle, from which it is drawn by suitable feeding devices. These include a pair of corrugated rolls 28, 28, which are so positioned that they will powerfully compact the advancing cotton and form a comparatively tight bat 30. This bat is held rigidly by the rollers and from its forward end the lint filaments are picked off by the rapidly revolving teeth 31.

As already described, the saw segments are so positioned in relation to any line at the end of the bat, parallel to the cylinder axis, that such line will be intersected at each of its points by a number of teeth during each revolution of the cylinder. By making the holders D of sheet metal and forming them by a stamping or pressing action, the cost is reduced to approximately one-half that of the ordinary gin cylinders. And the holders are so thin that I can bring the saw segments very close together, and yet produce a cylinder much lighter than those ordinarily made.

Heretofore cylinders of this class have been made with a heavy metallic drum (circular or polygonal in section) interposed between the shaft and the saws. This drum I dispense with in the present construction. If it is necessary to remove a segment which has been twisted, marred, or broken, and insert another, it can be readily done, and without taking the cylinder out from the machine, as it is only necessary to slightly loosen the nuts 27, 27a, inasmuch as this permits any selected segment to be separated from its dowel pins, or lugs, 16 16a, and withdrawn, and as readily permits the substitution of a new segment.

It will be seen that the saw cylinder, when considered as an entirety, may be regarded as comprising a relatively elongated supporting element and a series of sets of toothed saw segments. The saw segments illustrated, and as above described, are each positioned in a plane slightly inclined to planes that are normally transverse to the axis; and the support is the body produced by the series of holders D, interlocked with the axle and braced firmly against each other.

What I claim is:

1. A toothed cylinder for separating fibers having a rotary relatively elongated axially positioned supporting element, and a series of sets of independent toothed saw segments each normally lying in a plane slightly inclined in the same direction with respect to the planes normally transverse to the axis of the cylinder.

2. A toothed cylinder having an elongated and radially expanded rotary support, and a series of sets of peripherally short saw segments all fixed on the said support, each segment having a plurality of teeth, the teeth of each segment being respectively in different transverse planes and the series of teeth of each segment being inclined in the same general direction to planes normally transverse to the axis of the cylinder.

3. A toothed cylinder of the class described, having a rotary support, and a series of sets of saw segments fixed relatively to the said support, each segment being separable from the others of its set and lying in a plane inclined to planes normally transverse to the axis.

4. A toothed cylinder of the class described, having a rotary support, a series of sets of independently removable saw segments, each segment being peripherally short and radially narrow and positioned in a plane slightly inclined to planes normally transverse to the axis.

5. In a toothed cylinder of the class described, a rotary support, a series of sets of saw segments, each separable from the other segments of its set and having at its periphery a plurality of teeth arranged to rotate in different transverse planes, and means for detachably securing all of the said segments rigidly to the support.

6. A toothed cylinder of the class described, having a rotary support, and a plurality of peripherally short, independently removable saw segments secured thereto, each segment having at its periphery a set of teeth which rotate respectively in different transverse planes, the segments being arranged relatively to the axis to have a line parallel to the axis, and lying in the surface generated by the cylinder, intersected at each of its points by one of said teeth.

7. A toothed cylinder of the class described comprising a plurality of saw segments, each of which is peripherally short and has a series of teeth inclined to planes normally transverse to the axis of the cylinder, and a rotary support for said segments comprising a holder having a plurality of stepped spaces, each with a radial face positioned in a plane inclined to planes that are normally transverse to the axis.

8. A toothed cylinder of the class described, having a rotary support, and a plurality of independently removable saw segments, each segment extending only a part way around the axis and having at its periphery a plurality of teeth approximately in the arc of a circle and respectively rotating in different transverse planes, and devices removably securing each segment rigidly to the support.

9. For supporting a set of peripherally short saw segments in a cylinder of the class described, an axially adjustable holder having a set of stepped faces each adapted to receive a saw segment and each with a radial face positioned in a plane inclined to planes that are normally transverse to the axis.

10. In a toothed cylinder of the class described, the combination with a rotary shaft, of a series of axially movable spacing devices, each formed with a circular set of flat faced steps, each step face being in a plane slightly inclined to normally transverse planes and other than the planes of adjacent step faces, and a set of independently removable saw segments, each positioned against one of said step faces and rigidly fastened relatively to the spacing devices.

11. In a toothed cylinder of the class described, the combination with a rotary shaft, and a series of axially movable spacing devices each extending continuously around the axis, of a set of peripherally independently removable saw segments, each positioned to have its teeth on a line in a plane inclined to normally transverse planes, and all the segments of a set engaging with a spacing device, and held thereby rigidly both axially and radially.

12. For supporting a set of peripherally short saw segments in a cylinder of the class described, an axially adjustable holder formed of sheet metal bent to provide a set of stepped spaces each adapted to receive a saw segment and spaced by radially extending spacing and strengthening walls and also bent to provide axially extending projections adapted to engage with a saw segment to prevent its displacement on radial lines.

13. For supporting a set of saw segments in a saw cylinder of the class described, an axially movable holder formed of sheet metal bent to provide a stepped series of spaces each with a radial face positioned in a plane inclined to planes that are normally transverse to the axis, and bent also to provide a peripheral spacing flange on the holder and supplemental spacing devices between the periphery and the axis.

14. For supporting the saw segments of a saw cylinder of the class described, a holder formed from a disk of sheet metal bent to provide a series of stepped recesses each adapted to receive one or more of said saw segments, and also bent to provide a stepped peripheral flange and spacing and bracing devices supplemental to said flange.

15. For supporting a series of saw segments in a saw cylinder of the class described, an axially adjustable holder formed of a disk of sheet metal bent to provide a series of stepped spaces each with a wall adapted to engage the side face of a saw segment and bent to have axially extending dowels, stops, and bracing devices.

16. In a toothed cylinder of the class described, the combination with a series of sets of saw segments, the segments of each set extending around the axis, of a series of sheet metal holders each bent to provide a circular series of seats with active faces inclined to planes normally transverse to the axis and adapted to receive a saw segment, and means for holding the segments in normal position against said faces.

17. In a saw cylinder of the class described, the combination with a series of sets of saw segments, those of each set extending in a line around the axis, of a series of holders for said segments, each holder being formed of a disk of sheet metal bent to provide a series of stepped faces and a series of spacing and bracing devices, the stepped faces being adapted to receive and hold in working position one or more of the said saw segments.

18. In a toothed cylinder of the class described, the combination with a series of sets of saw segments, those of each set extending in a line around the axis, of a series of holders for said segments, each holder being formed of a disk of sheet metal bent to provide a series of stepped faces to receive and hold in working position one or more of said saw segments, said faces being similarly inclined to planes normally transverse to the axis whereby the corresponding individual teeth on the several segments will intersect during rotation of the disk, a common point in a line parallel to the axis and lying in the surface generated by the cylinder.

19. For supporting a series of saw segments in a saw cylinder of the class described, an axially adjustable clamp formed of a disk of sheet metal bent to provide a series of stepped faces each with a wall adapted to engage the side face of a saw segment, the said faces being similarly inclined to planes normally transverse to the axis of the disk.

20. A toothed cylinder for separating fibers having a rotary axially positioned supporting element, and a series of saw segments on said element, the segments normally lying in a plane slightly inclined to the planes normally transverse to the axis of the cylinder and being similarly inclined whereby during rotation of the cylinder the corresponding individual teeth in the segments will pass through a common point in a line parallel to the axis and lying in the surface generated by the cylinder.

21. For supporting a series of saw segments in a saw cylinder of the class described, an axially adjustable holder formed of sheet metal bent to provide a set of stepped spaces each adapted to receive a saw segment and each having a radial face positioned in a plane inclined to planes that are normally transverse to the axis.

In testimony whereof, I affix my signature.

ALEXANDER S. MacKENZIE.